Nov. 1, 1960    C. TREPP    2,958,203
GAS PURIFICATION METHOD
Filed Jan. 21, 1959

INVENTOR.
CHRISTIAN TREPP
BY K. A. Mayr
ATTORNEY.

United States Patent Office 2,958,203
Patented Nov. 1, 1960

2,958,203

GAS PURIFICATION METHOD

Christian Trepp, Zurich, Switzerland, assignor to Sulzer Freres, S.A., Winterthur, Switzerland Filed Jan. 21, 1959, Ser. No. 788,154

Claims priority, application Switzerland Feb. 1, 1958

1 Claim. (Cl. 62—12)

The present invention relates to a method for purifying a gas by freezing out the impurity in two heat exchangers whereby one heat exchanger is in operation in a first operating cycle while the other heat exchanger is defrosted, the heat exchangers being operated in reverse order in a second operating cycle so that in each operating cycle the gas to be purified flows only through the heat exchanger which is in operation, a cooling agent flowing through the heat exchanger which is in operation and thereupon through the other heat exchanger for defrosting the latter.

In the method according to the invention purification is effected by freezing out one or more or all components which contaminate the gas. This includes the case in which the gas, after the purification, still contains foreign components which have not yet been removed, for example purposely, or which could not be removed together with the frozen out components and which must be removed in a subsequent freezing out operation.

According to the invention the medium for thawing off the impurities is in indirect heat exchange relation with the frozen impurities through a heat exchange surface in one of the heat exchangers from which the thawed off impurities are removed.

In the apparatus for carrying out the method according to the invention the coolant is consecutively conducted through the primary sides of two heat exchangers whereas the gas to be purified is conducted through the secondary side of that one only of the heat exchangers through which the coolant flows first. In the system according to the invention the gas to be purified is not used for defrosting. The coolant which is used for freezing impurities in one heat exchanger and which is thereby heated is used for defrosting the second heat exchanger. The thawing off substance is not conducted through a conduit containing frozen-out impurities but only indirectly exchanges heat with frozen-out impurities. Nothing flows through the secondary side of a heat exchanger while the frozen impurities therein are thawed off so that it is impossible that for instance a portion of the thawed off and reevaporated impurities can be taken along by the medium for thawing off the impurities and remain in the apparatus, and are, eventually, conducted from one heat exchanger to the other and conducted in reverse order after each reversal of operation of the heat exchangers.

In a modification of the method according to the invention only a part of the coolant cooling the heat exchanger which is in operation is used for heating and thawing off the heat exchanger which is not in operation. It is of advantage to conduct fresh coolant in parallel relation through both heat exchangers at the end of each operating cycle and prior to reversing the operation of the heat exchangers so that the heat exchanger which was thawed off is precooled preparatory to the following operating cycle. In this way heat shocks are avoided when the operation of the heat exchangers is reversed, which shocks may interfere with the proper functioning of subsequent apparatus of a connected refrigerating plant, for example, a rectifying column which requires constant temperature conditions. By the aforedescribed precooling temporary undesired great temperature differences are avoided in the heat exchangers which differences disturb the ideal, thermodynamically optimal heat exchange conditions.

The novel features which are considered characteristic of the invention are set forth with particularity in the appended claim. The invention itself, however, and additional objects and advantages thereof will best be understood from the following description of embodiments thereof when read in connection with the accompanying drawing in which:

Figure 1:
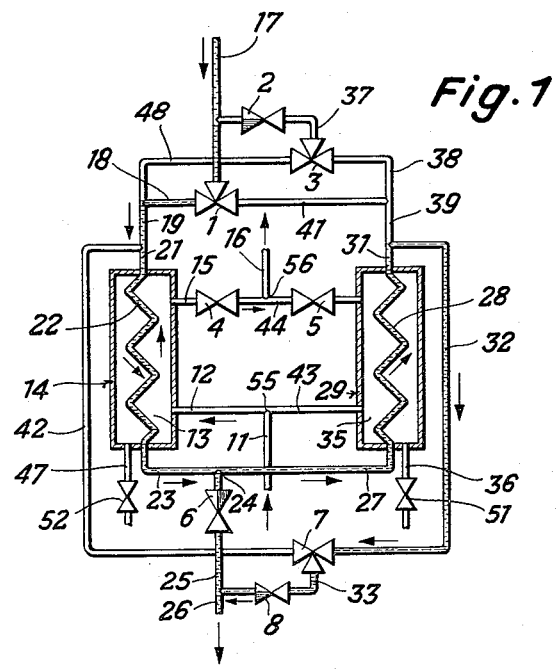
Fig. 1 is a diagrammatic illustration of a part of a gas liquefaction plant arranged for performing one operating cycle according to the invention.

Referring more particularly to the drawing, the high pressure gas to be purified and to be liquefied, for example, hydrogen, is admitted at a temperature of, for example, 80° K. and 3 atm. absolute in a first operating cycle through conduits 11, 12 and flows through a first conduit 13 of a heat exchanger 14 in which it is cooled at constant pressure to about 25° K. Thereupon the gas flows through a valve 4 in a pipe 15 and through a pipe 16 to additional apparatus, not shown, and therefrom to a rectifying column, not shown and including substance exchange conduits in which the gas flows in upward direction and in substance exchange relation with downward flowing liquid hydrogen for enrichment of hydrogen containing deuterium. A part of the vapor collecting in the upper chamber of the rectifying column and having a temperature of, for example, 23° K. and a pressure of, for example, 2 atm. absolute is conducted through a pipe 17, a three-way valve 1 and pipes 18, 19, 21 to a second conduit 22 of the heat exchanger 14 to exchange heat with the raw hydrogen flowing through the conduit 13. The vapor in the conduit 22 is thereby heated to approximately 75° K. The cooling medium in the conduit 22 causes freezing out of an impurity, for example, nitrogen, in the raw hydrogen in the conduit 13. The frozen impurity adheres to the outside of the conduit 22 which may be in the form of a coiled tube. After leaving the conduit 22 the coolant is conducted through a pipe 23 to a branch point 24.

A part of the coolant flows through a valve 6 to a pipe 25, 26. After condensation of this part, it may be returned to the rectifying column to flow downward through the latter. The pressure in the pipe 25, 26 is a few tenths of an atm. lower than the pressure in the conduit 22. The balance of the coolant flows from the point 24 through a pipe 27 into a conduit 28 of a heat exchanger 29. From the conduit 28 the coolant flows through pipes 31, 32, a three way valve 7, and through a valve 8 in a pipe 33 into the pipe 26 wherefrom it may be returned to the rectifying column. The valves 7 and 8 control the heating of the heat exchanger 29 because they control the flow of heated coolant from the point 24 through the heat exchanger 29.

The coolant which enters the heat exchanger 14 through pipe 21 at a temperature which is, for example, 40° K. lower than the fusion temperature of the impurity which must be frozen out (for example nitrogen whose fusion temperature is 63° K.), is heated in the conduit 22 by the raw hydrogen and its impurity to a temperature which is, for example, 10° K. lower than the dew point of the impurity, for example 77° K. in the case of nitrogen, but which is higher than the fusing temperature of the impurity. The portion of the coolant flowing through the pipe 27 can therefore thaw off the impurity which was frozen to the outside of the tube coil 28 during the preceding operating cycle. The liquefied impurity accummulates at the bottom of the conduit 35 and may be removed through pipe 36 provided with a valve 51.

Figure 2:
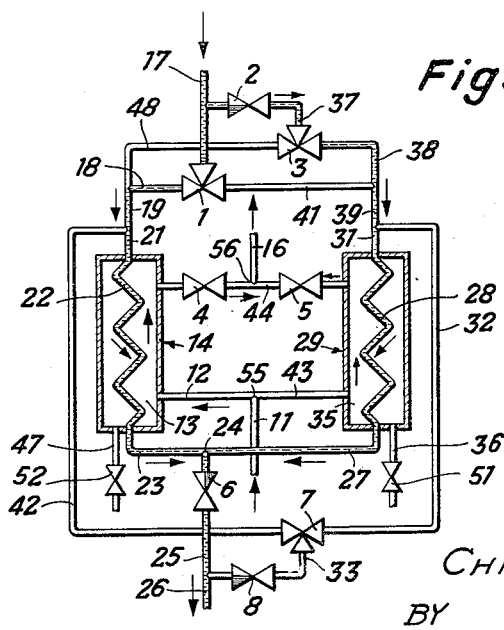
Fig. 2 illustrates the plant shown in Fig. 1 in position between two operating cycles.

After the aforedescribed thawing off of the heat exchanger 29 and after removal of the impurity from the conduit 35, a valve 2 is opened and the opening of the valve 6 is increased so that a portion of the low pressure gas supplied through the pipe 17, which portion is smaller than the amount flowing through the pipe 18, is conducted through a pipe 37, a three way valve 3 and through pipes 38, 39 and 31 to the conduit 28 of the heat exchanger 29, as shown in Fig. 2. After passage of the coolant through the conduit 28 it is conducted through the pipe 27 and past the branch point 24 to the pipes 25 and 26. The heat exchanger 29 is thereby precooled to be ready for the following cycle which is the operating cycle of the heat exchanger 29. This precooling is controlled by the valves 2 and 3 which regulate the portion of the coolant taken from the pipe 17.

After a suitable period of time the three-way valve 1 is so set as to connect the pipes 17 and 41, and the valve 7 is set to connect the pipes 42 and 33. The opening of the valve 6 is reduced to the previous degree of opening, the valve 5 is opened, and the valves 2 and 4 are closed.

The system is now set for carrying out purification in the heat exchanger 29. The raw high pressure hydrogen flows from the pipe 11 through the pipe 43 through the conduit 35 of the heat exchanger 29 and thereupon through the pipes 44 and 16 to additional apparatuses, not shown. The coolant, which is a low pressure gas, flows from the pipe 17 through the pipes 41, 39, 31 to the conduit 28 of the heat exchanger 29 and therefrom through the pipe 27, 25, 26 to the rectifying column, not shown. A part of the low pressure coolant leaves the pipe 27 at the branch point 24 and flows through the pipe 23 into the conduit 22 of the heat exchanger 14 and therefrom through pipes 21, 42, 33 into the pipe 26. In the aforedescribed operating cycle the impurity of the high pressure gas is frozen out in the heat exchanger 29 and the heated medium which leaves the conduit 28 is used for defrosting the heat exchanger 14.

When the heat exchanger 29 becomes clogged by the frozen impurity or if the active heat exchange surfaces become too small because of the deposited frozen impurity and after the substance thawed off in the conduit 13 has been removed through the pipe 47 and through the valve 52, the valve 2 is opened and the three-way valve 3 is so set that the pipes 37 and 48 are interconnected. The opening of the valve 6 is increased so that a relatively small portion of the coolant supplied by the pipe 17 flows through the pipes 37, 48, 19, 21 to the conduit 22 of the heat exchanger 14 and thereupon flows through pipes 23, 25 and 26. The heat exchanger 14 is thereby precooled and prepared for the subsequent operating cycle in which the heat exchanger 14 is active and the heat exchanger 29 is defrosted.

If desired, a temporary freezing out period may be interposed between the precooling operation illustrated in Fig. 2 and the subsequent operating cycle in which the heat exchanger 14 is defrosted, while the two heat exchangers 14 and 29 are connected in parallel relation with the supply pipe 17 for the low pressure gas, as during the precooling period, whereby the conduits 22 and 28 are in parallel relation and the conduits 13 and 35 are connected in parallel relation with the supply pipe 11 for the raw gas so that impurities are frozen out in both heat exchangers. This intermediate freezing out period cannot last very long because only a limited amount of frozen components should be accummulated in the heat exchangers when changing to the subsequent operating cycle. During the time during which one of the heat exchangers is defrosted subsequently to an intermediate freezing out period, if such period is provided, the other heat exchanger must be in a position to receive a sufficient amount of impurity which must be frozen. Therefore, this other heat exchanger must not be clogged by the frozen impurity and must be in operating condition when changing from the intermediate freezing out period to the subsequent operating cycle.

The action of the valve 6 is twofold. Its flow area can be reduced during one operating cycle to pass a portion of the medium coming from the pipes 23 or 27 and can be increased during the time between two operating cycles when the defrosted heat exchanger is precooled. In this way the pressure in the pipes 25, 26 and in the subsequent apparatuses can be maintained constant during the normal operating cycles as well as during the precooling periods. On the other hand, the valve 6 can be used for controlling the total amount of gas supplied through the pipe 17 and removed through the pipe 26, which amount must be greater, if the amount of raw gas to be purified and supplied per time unit through the pipe 11 increases. The portion of the coolant coming from pipe 17 and conducted during the precooling period through the heat exchanger which must be precooled is usually small relatively to the portion of the coolant which is used for freezing the other heat exchanger. The ratio of both portions during the precooling periods can be regulated by proper setting of the flow area of the element 2.

If desired, the pipes 12 and 43 may be provided with valves either in addition or in lieu of the valves 4 and 5, respectively. Three-way valves may be placed at the branch points 55 and 56 for partly or wholly replacing the valves 4 and 5 and the valves which may be arranged in the pipes 12 and 43.

I claim:

A method for purifying a gas by freezing out the impurity, including passing the gas to be purified through a first heat exchanger, passing a fresh coolant through the first heat exchanger for indirect heat exchange with the gas to be purified and cooling the latter for freezing out the impurity, thereupon stopping passage of gas to be purified through the first heat exchanger and passing the gas to be purified through a second heat exchanger, passing fresh coolant through the second heat exchanger for indirect heat exchange with the gas to be purified and cooling the latter for freezing out the impurity, passing at least a portion of the coolant, heated by the heat exchange in the second heat exchanger from the latter through the first heat exchanger for defrosting the latter, removing the thawed off impurity from the first heat exchanger, whereupon the gas to be purified is again conducted through the first heat exchanger and the coolant is passed consecutively through the first and then through the second heat exchanger, passing, subsequently to removal of the thawed off impurity from one of the heat exchangers and prior to passing gas to be purified through the just defrosted heat exchanger, fresh coolant in parallel relation through both heat exchangers for precooling and making the just defrosted heat exchanger ready for conducting the gas to be purified through and freezing out the impurity in the just defrosted heat exchanger, and, after the precooling of the just defrosted heat exchanger and prior to stopping passage of gas to be purified through the heat exchanger in which the impurity is frozen out, conducting gas to be purified in parallel relation through both heat exchangers for freezing out the impurity in both heat exchangers for a limited period of time which is defined by the capacity of the precooled heat exchanger to freeze out additional impurity and thereby heat the coolant to defrost the heat exchanger through which the passage of gas to be purified will be stopped.

References Cited in the file of this patent
UNITED STATES PATENTS 1,842,263    Gobert              Jan. 19, 1932